(12) United States Patent
Sydir et al.

(10) Patent No.: US 8,031,604 B2
(45) Date of Patent: Oct. 4, 2011

(54) ALGORITHM FOR GROUPING STATIONS FOR TRANSMISSION IN A MULTI-PHASE FRAME STRUCTURE TO SUPPORT MULTI-HOP WIRELESS BROADBAND ACCESS COMMUNICATIONS

(76) Inventors: Jaroslaw J. Sydir, San Jose, CA (US); Wendy C. Wong, San Jose, CA (US); Kerstin Johnsson, Palo Alto, CA (US); Hyunjeong Hannah Lee, Hillsboro, OR (US)

( * ) Notice: Subject to any disclaimer, the term of this patent is extended or adjusted under 35 U.S.C. 154(b) by 668 days.

(21) Appl. No.: 11/923,595

(22) Filed: Oct. 24, 2007

(65) Prior Publication Data
US 2008/0137583 A1 Jun. 12, 2008

Related U.S. Application Data

(60) Provisional application No. 60/854,466, filed on Oct. 25, 2006.

(51) Int. Cl.
*H04J 3/16* (2006.01)
(52) U.S. Cl. ......... 370/235; 370/329; 370/437; 370/458
(58) Field of Classification Search .................. 370/229, 370/230, 235, 252, 254, 310, 458, 315, 328, 370/329, 431, 437; 455/7
See application file for complete search history.

(56) References Cited

U.S. PATENT DOCUMENTS

| | | | | |
|---|---|---|---|---|
| 6,674,737 | B1 * | 1/2004 | Baker | 370/338 |
| 2002/0141343 | A1 * | 10/2002 | Bays | 370/235 |
| 2003/0058816 | A1 | 3/2003 | Shearer, III | |
| 2005/0063319 | A1 | 3/2005 | Kyperountas et al. | |
| 2005/0117610 | A1 * | 6/2005 | Chevallier et al. | 370/521 |
| 2006/0083197 | A1 * | 4/2006 | Kang | 370/329 |
| 2006/0120346 | A1 * | 6/2006 | Kitamura et al. | 370/351 |

FOREIGN PATENT DOCUMENTS

| | | |
|---|---|---|
| JP | 2006041633 A | 2/2006 |
| JP | 2006246002 A | 9/2006 |
| WO | 02/37752 A1 | 5/2002 |
| WO | 2008/051609 A2 | 5/2008 |
| WO | 2008/051609 A3 | 7/2008 |

OTHER PUBLICATIONS

International Search Report and Written Opinion of the International Searching Authority; Dated Apr. 29, 2008; PCT/US2007/022701 (12 pgs.).
International Preliminary Report on Patentability received for PCT Patent Application No. PCT/US2007/022701, mailed on May 7, 2009, 6 pages.
Extended European Search Report received for European Patent Application No. 07852976.5, mailed on Nov. 10, 2010, 7 pages.
Wong et al.; "Mapping of Preamble Sequence Sets With Frame Control Header (FCH) Location for Multi-Hop Wireless Broadband Access Communications", U.S. Appl. No. 11/923,586, filed Oct. 24, 2007, 11 pages.
Wong et at.; "Multi-Phase Frame Structure to Support Multi-Hop Wireless Broadband Access Communications", U.S. Appl. No. 11/923,566, filed Oct. 24, 2007, 12 pages.

* cited by examiner

*Primary Examiner* — Seema S. Rao
*Assistant Examiner* — Mon Cheri Davenport
(74) *Attorney, Agent, or Firm* — Scott M. Lane

(57) ABSTRACT

A station grouping mechanism has been presented for a wireless device that collects Multi-hop Relay Base Station (MR-BS) and Relay Stations (RSs) into groups according to their locations in a tree topology and assigns them with a phase. Grouping or partitioning MR-BS and RSs and assigning a distinct phase to the group prevent the MR-BS and the RSs from transmitting and receiving at the same time.

14 Claims, 4 Drawing Sheets

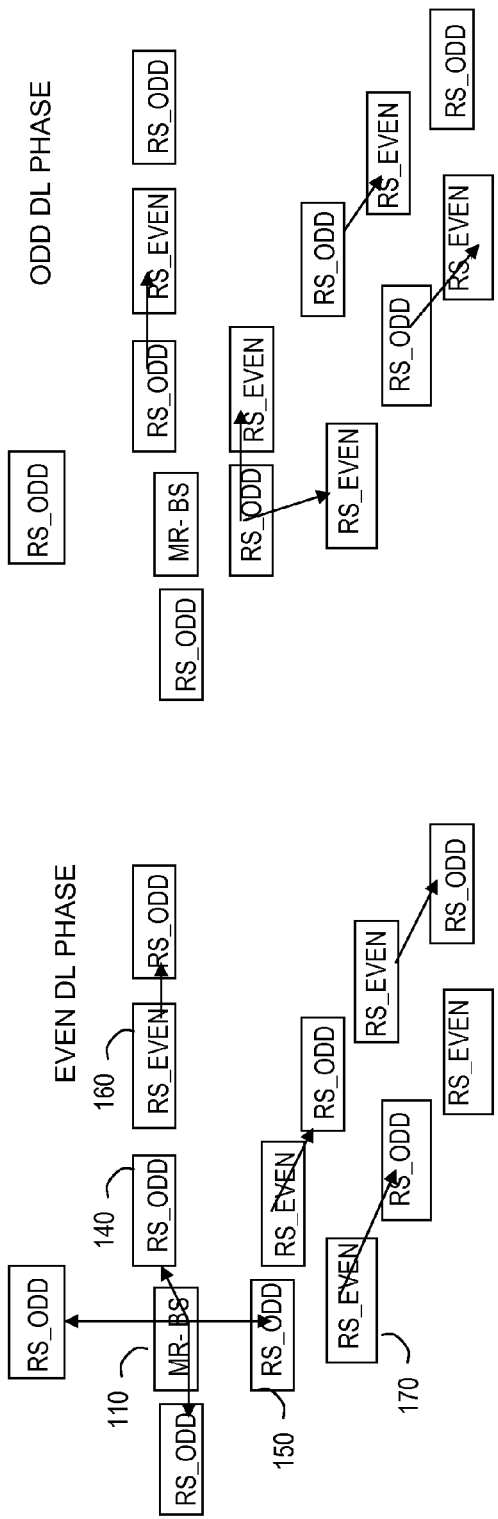
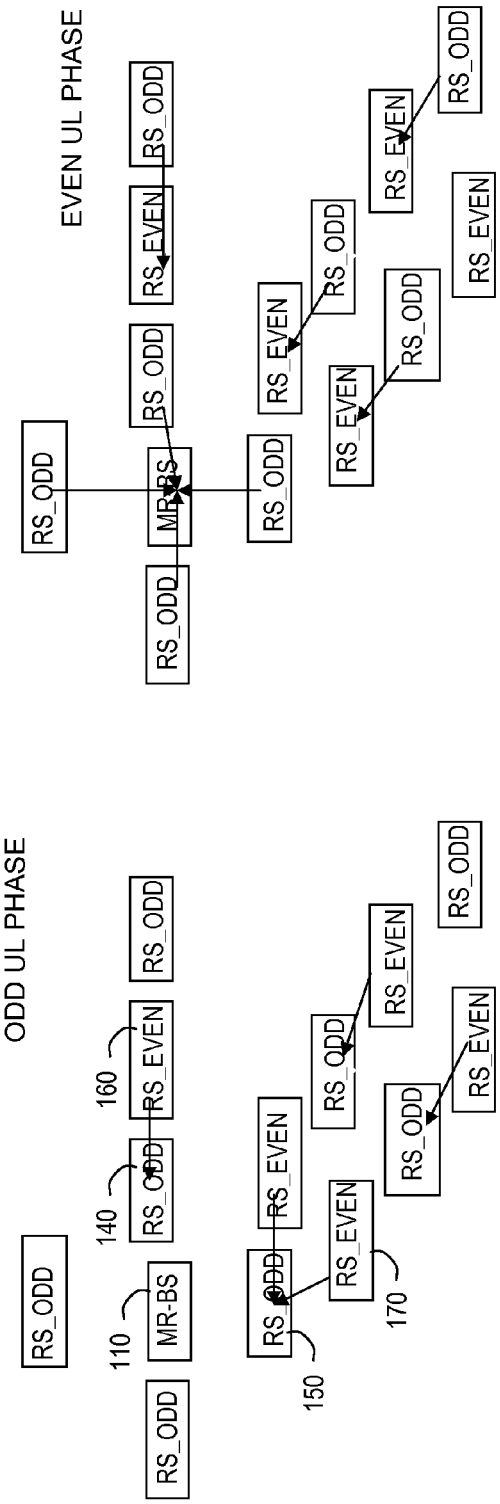
FIG. 3 EVEN DL PHASE
FIG. 4 ODD DL PHASE
FIG. 5 ODD UL PHASE
FIG. 6 EVEN UL PHASE

| PHASE NUMBER | STATIONS THAT MAY TRANSMIT |
|---|---|
| 0 | MR-BS, RSs that are 5 hops away from the MR-BS |
| 1 | RSs that are 1 hop and 6 hops away from the MR-BS |
| 2 | RSs that are 2 hops and 7 hops away from the MR-BS |
| 3 | RSs that are 3 hops and 8 hops away from the MR-BS |
| 4 | RSs that are 4 hops away from the MR-BS |

FIG. 7

ALGORITHM FOR GROUPING STATIONS FOR TRANSMISSION IN A MULTI-PHASE FRAME STRUCTURE TO SUPPORT MULTI-HOP WIRELESS BROADBAND ACCESS COMMUNICATIONS

The present application claims priority to U.S. patent application Ser. No. 60/854,466, filed Oct. 25, 2006, entitled "Algorithm for Grouping Stations for Transmission in a Multi-Phase Frame Structure to Support Multi-Hop Wireless Broadband Access Communications," the entire disclosure of which is hereby incorporated by reference in its entirety.

Developments in a number of different digital technologies have greatly increased the need to transfer data from one device across a network to another system. Technological developments permit digitization and compression of large amounts of voice, video, imaging, and data information, which may be transmitted from laptops and other digital equipment to other devices within the network. These developments in digital technology have stimulated a need to deliver and supply data to these processing units.

It is becoming increasingly attractive to use wireless nodes in a wireless network as relaying points to extend range and/or reduce costs of a wireless network. A Multi-hop Relay (MR) network may use fixed and/or mobile stations as relaying points to optimize communications and increase the efficiency of transmissions. One notable issue is how to coordinate the selection of optimal transmission paths using new protocols and architectures and reduce costs associated with these networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3-6 illustrate examples of communications that may occur during the various phases of frame structure 200; and FIG. 7 is a table that provides an example of grouping DL stations for one embodiment of an M-phased frame structure.

Figure 1:
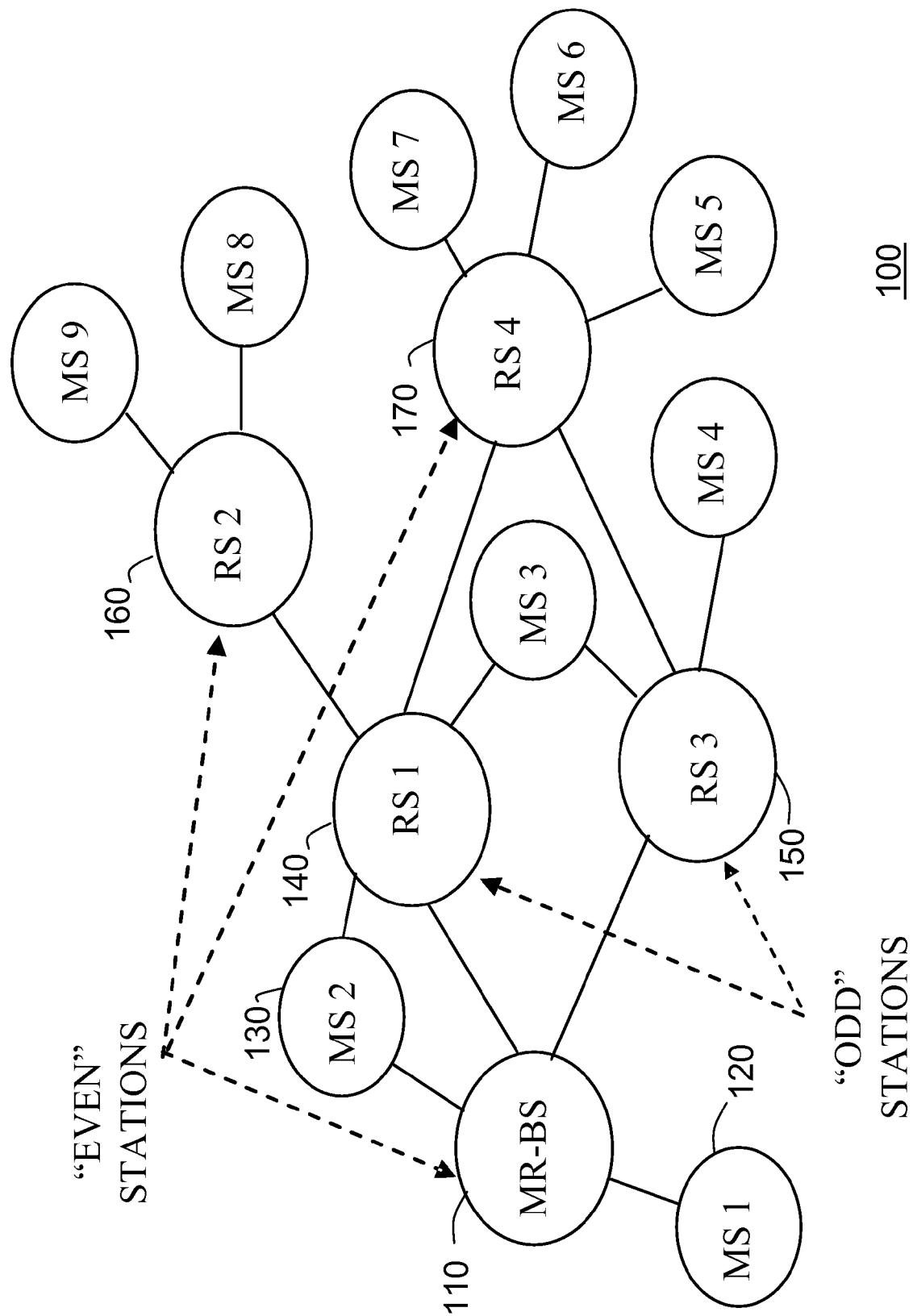
FIG. 1 is a diagram illustrating an arrangement of wireless nodes in an example wireless network for explicitly conveying multi-hop link information such as "even" and "odd" stations according to one embodiment of the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Wireless multi-hop relay systems have become the focus of several current standardization efforts. For example, for WLANs the Institute of Electrical and Electronics Engineers (IEEE) 802.11s Mesh Task Group (TG) is actively working on standard solutions for WLAN mesh networking. Additionally, the IEEE 802.16j Multi-hop Relay (MR) task group is also evaluating solutions for standardization in furtherance of the IEEE 802.16j project approval request for wireless broadband access (WBA) networks.

The multi-hop relay systems provide a cost effective way for multi-media traffic to increase in range. The relay stations offer extended coverage through existing networks and the MR system is a cost effective solution accommodating many mobile subscribers, establishing wide area coverage and providing higher data rates. Thus, the multi-hop relay systems enhance throughput and capacity for 802.16 systems and enable rapid deployment which reduces the cost of system operation.

MR relay stations are intended to be fully backward compatible in the sense that they should operate seamlessly with existing 802.16e subscriber stations. A further phase of 802.16 is expected to introduce enhanced relay and WBA subscriber stations designed for use in MR networks. While the embodiments discussed herein may refer to 802.16 wireless broadband access networks, sometimes referred to as WiMAX, an acronym that stands for Worldwide Interoperability for Microwave Access, which is a certification mark for products that pass conformity and interoperability tests for the IEEE 802.16 standards, they are not so limited and may be applicable to WLAN, other types of mesh networks or even combinations of different networks. Multi-hop relay techniques may be applied to other emerging standards such as 3rd Generation Partnership Project (3GPP) for the Long Term Evolution (LTE).

FIG. 1 is a diagram illustrating an arrangement of wireless nodes in an example wireless network for conveying multi-hop link information according to one embodiment of the present invention. A Multi-hop Relay (MR) network 100 may be any system having devices capable of transmitting and/or receiving information via at least some Over-The-Air (OTA) Radio Frequency (RF) links. For example in one embodiment, the topology of MR network 100 may include an MR Base Station (MR-BS) 110 that provides direct access to multiple Mobile Stations (MSs) 120 and 130. MR-Base Station 110 also connects to a plurality of unwired relay nodes shown as Relay Stations (RS) 140 and 150 in the figure.

Relay Stations (RSs) 140 and 150 wirelessly communicate and relay messages in MR network 100 using wireless protocols and/or techniques compatible with one or more of the various 802 wireless standards for WPANs and/or standards for WMANs, although the inventive embodiments are not limited in this respect. As illustrated in the figure, Relay Stations (RSs) 140 and 150 provide access to Mobile Stations 120 and 180 as well as relay data on behalf of other RSs. In certain non-limiting example implementations of the inventive embodiments, the topology illustrated is tree-like with the MR-BS at the root and MSs at the leaves with multiple communication paths or links between the MR-BS and MSs. Access links support direct communication paths between the MR-BS and the MS and further between the RS and the MS. Relay links support direct communication paths between the MR-BS and the RSs and further between RSs.

MR network 100 may be comprised of several macro cells, each of which may generally comprise at least one base station similar to MR base station 110 and a plurality of relay stations similar to RSs 140 and 150 dispersed throughout each macro cell and working in combination with the base station(s) to provide a full range of coverage to client stations. The multi-hop topology between MR-BS 110 and RSs 140 and 150 can be viewed as a Point-to-Multipoint (PMP) link. Further, RS 140 is connected to RS 160 and RS 170 via a PMP link, where each PMP link relies on the stations to maintain time and frequency synchronization that is performed via the broadcast and reception of a downlink (DL) preamble, whereas uplink (UL) synchronization is performed by a ranging process.

MR network 100 utilizes a frame structure which allows multiple relay links to share a channel, and thus, multiple PMP links may be supported on the same channel. When multiple PMP links share a channel, the stations that participate in the links synchronize and data is transmitted to minimize interference. The frame structure is configurable to optimize the topology and the requirements for deployment and allow the multiple PMP links to share the channel while utilizing a combination of time division multiplexing (TDM) and spatial reuse.

In accordance with the present invention, embodiments of MR network 100 support the 802.16j standard with a topology in which the paths between MR-BS 110 and MS may be more than two hops in length. In a TDD system, the RS does not transmit and receive at the same time in order to keep the transmitted signal from drowning out the received signal. MR network 100 supports a frame structure that groups multiple RSs into phases to prevent the RSs from transmitting and receiving simultaneously under topologies of arbitrary hop size.

As already mentioned, MR network 100 has the basic structure of a tree topology to support multi-hop communications via a shared channel that ensures that stations cannot simultaneously receive and transmit on a channel. In accordance with the present invention, the MR-BS and the various RSs are assigned to separate groups based on whether they are an even or odd number of hops from the MR-BS. In the figure MR-BS 110 and RS 160 and RS 170 are designated as "even" stations, while RS 140 and RS 150 are classified as "odd" stations. Odd stations do not receive data from other odd stations and even stations do not receive data from other even stations. Thus, odd stations may transmit within the same part of the frame without violating the constraint that a station not transmit and receive simultaneously. Similarly, even stations may transmit within the same part of the frame without violating the constraint that a station not transmit and receive simultaneously. By the appropriate grouping of stations into different phases of a frame, multi-hop communication may be achieved over a shared channel.

Figure 2:
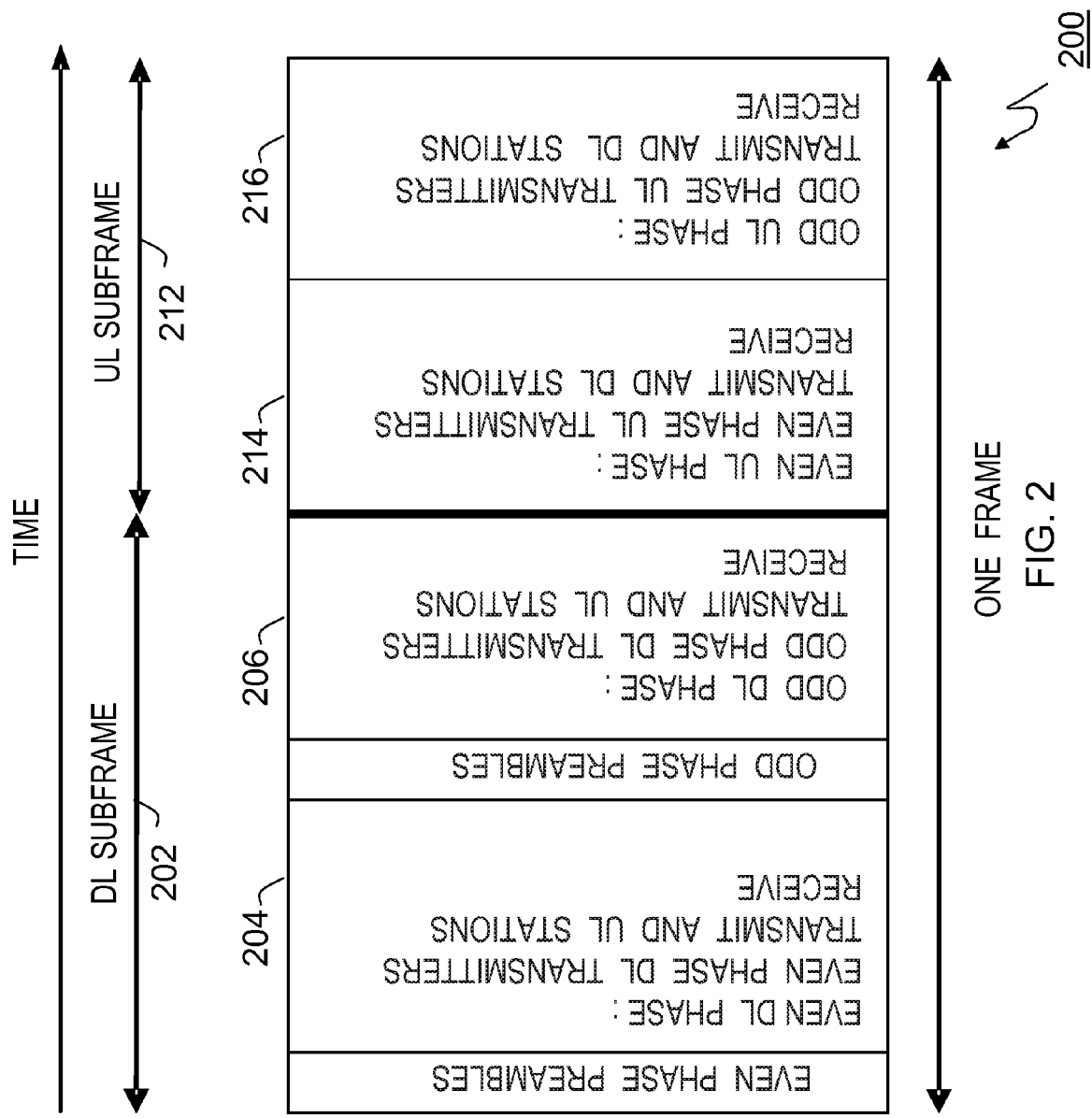
FIG. 2 is an embodiment of a frame structure with multiple phases that may be dynamically adjusted to support any hop network and any number of Relay Stations (RSs) deployed in the system.

FIG. 2 illustrates a two-phased frame structure 200 that supports multi-hop communications over a shared channel. Note that the two-phases are provided for simplicity of illustration and the invention is not limited to two-phases. Frame structure 200 is suitable for TDD operations that efficiently use a frequency channel that is assigned to both the transmitter and the receiver. TDD is suited to the transport of asymmetric traffic that utilizes both an uplink (UL) and a downlink (DL) traffic using the same frequency $f_0$ but at different times. In effect, TDD divides the data stream into frames and, within each frame assigns different time slots to the forward and reverse transmissions. The figure shows a TDD frame divided into a DL subframe 202 and a UL subframe 212, with each of the DL and UL subframes further divided into a number of phases.

The stations may be designated as an even number of hops from the MR-BS (including the MR-BS itself) and transmit in the "even" downlink DL phase and receive in the "even" uplink UL phase (the MR-BS does not transmit in the UL). On the other hand, stations that are designated as an odd number of hops from the MR-BS may transmit in the "odd" DL phase and receive in the "odd" UL phase. RS 160 and RS 170 are designated, for example, as having an even number of hops from MR-BS 110 and transmit in the "even" downlink DL phase 204 (reference to FIG. 2). RS 160 and RS 170 may receive in the "even" uplink UL phase 214. Also by way of example, RS 140 and RS 150 may be designated as having an odd number of hops and transmit in the "odd" downlink DL phase 206. RS 140 and RS 150 may receive in the "odd" uplink UL phase 216.

FIGS. 3-6 provide examples of communications that may occur during the various phases of frame structure 200. FIG. 3 illustrates communications in the "even" DL phase 204 (refer to FIG. 2) where MR-BS 110 and RS 160 and RS 170 are designated as an even number of hops from the MR-BS. In the DL phase 204 MR-BS 110 transmits in the DL direction away from the MR-BS as indicated by the arrows in the figure. RS 140 and RS 150 are designated as an odd number of hops from MR-BS 110 and receive in this DL phase 204. FIG. 4 illustrates communications in the "odd" DL phase. In this phase the RSs that are an odd number of hops from MR-BS 110 transmit in the DL direction and the RSs that are an even number of hops from the MR-BS receive. FIG. 5 illustrates communications in the "odd" UL phase. The RSs that are an even number of hops from MR-BS 110 transmit in the UL direction while the RSs that are an odd number of hops from the MR-BS receive. FIG. 6 illustrates communications in the "even" UL phase. In this phase the RSs that are an odd number of hops from MR-BS 110 transmit in the UL direction while the MR-BS and RSs that are an even number of hops from the MR-BS receive.

FIG. 7 shows a table that provides examples of grouping DL stations for embodiments of an M-phased frame structure in accordance with an algorithm for the present invention. A general M-phase grouping algorithm for a maximum RS chain of N hops illustrates that the interference among RSs per phase is reduced by spreading the RS across more phases.

D is defined as: D=ceil(N/M), where M is the number of phases and N is the number of hops.

During phase k, the MR-BS/RSs which are (M*d+k) hops away from the MR-BS transmit in the DL where d has values of 0, 1, 2, ..., D−1; k has values of 0, 1, ..., M−1; and all RS hop counts greater than N are ignored. By way of example for the case M=5 and N=8, the table shows the phases in which stations may transmit in the DL.

By now it should be apparent that a station grouping mechanism has been presented that collects MR-BS and RSs into groups according to their locations in a tree topology and assigns them with a phase. By grouping or partitioning MR-BS and RSs and assigning a distinct phase to the group, the MR-BS and the RSs are prevented from transmitting and receiving at the same time. Thus, a method of multi-hop communications over a shared channel has been presented that scales with the number of hops in the topology and with the number of RSs in the cell.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A station, comprising:
a transmitter to communicate in a multi-hop communications network using a multi-phase frame structure in a channel shared by the transmitter and a receiver of the station, the frame structure including a downlink (DL) subframe at the beginning of the frame, the DL subframe comprising an access link in an even phase and a relay link in an odd phase of the DL subframe wherein a first symbol in the DL subframe is a preamble, and an uplink (UL) subframe at the end of the frame structure comprising an access link in the even phase and a relay link in the odd phase, wherein the transmitter is configured to transmit in an even DL phase when the station is designated as an even number of hops from a multi-hop relay base station (MR-BS) and transmit in an odd downlink phase when designated as an odd number of hops from the MR-BS; and
the receiver, wherein the receiver and the transmitter are configured to not transmit and receive simultaneously.

2. The station of claim 1, wherein the station is a MR-BS, a multi-hop relay station (RS), or a mobile station (MS).

3. The station of claim 1, further comprising two or more access links to form a first group in the even phase and two or more relay links to form a second group in the odd phase of the DL subframe or the UL subframe.

4. The station of claim 3 wherein the first group of two or more access links are assigned to the first group to facilitate spatial reuse in the multi-hop relay network.

5. The station of claim 4 wherein the spatial reuse allows multiple stations to be assigned to the same phase if they will not generate too much interference between stations of the same phase.

6. The station of claim 2 wherein the station is assigned to an even phase if the station is the MR-BS.

7. The station of claim 1 where the frame structure uses Time Division Duplex (TDD) to transport asymmetric traffic that assigns different time slots to forward and reverse transmissions.

8. The station of claim 4 wherein a station assigned to an even phase does not receive data from other stations assigned to an even phase in the multi-hop relay network.

9. A wireless device, comprising:
a receiver to receive assignment to a group in accordance with a network location of the wireless device relative to a Multi-hop Relay Base Station (MR-BS); and
a processor algorithm to assemble packet data for transmission according to a single frame structure, wherein the single frame structure assigns the wireless device to transmit in an even downlink phase when the group is designated an even number of hops from the MR-BS and transmit in an odd downlink phase when designated an odd number of hops from the MR-BS, wherein the single frame structure further comprises a preamble and a plurality of links in a downlink subframe and an uplink subframe.

10. The wireless device of claim 9 wherein by grouping the MR-BS and wireless device and assigning a phase to the group, the MR-BS and the wireless device are prevented from transmitting and receiving at a same time.

11. The wireless device of claim 9 wherein the processor algorithm collects MR-BS and Relay Stations (RSs) into groups according to their locations in a tree topology and assigns them with a phase.

12. The wireless device of claim 11 wherein transmissions occur according to the single frame structure over a shared frequency channel in a multi-hop network.

13. The wireless device of claim 9 wherein the plurality of links are access links and relay links.

14. The wireless device of claim 13 wherein one or more of the access links and relay links are point to multipoint (PMP) links.

* * * * *